United States Patent Office 3,112,335
Patented Nov. 26, 1963

3,112,335
PHOSPHORIC ACID STYRENE OXIDE ESTER
Thomas E. Ronay, Oak Park, Robert D. Dexheimer, Naperville, and Ralph P. Arthur, Addison, Ill., assignors to The Richardson Company, Melrose Park, Ill., a corporation of Ohio
No Drawing. Filed Sept. 13, 1961, Ser. No. 137,736
8 Claims. (Cl. 260—461)

This invention is concerned with new and useful compounds obtained by reacting a phosphoric acid with styrene oxide.

In the patent to Adams et al. 2,372,244, there is disclosed a process for making esters of acids of phosphorus by reacting alkylene oxides with phosphorus or phosphoric acid. For example, when orthophosphoric acid represented by the formula

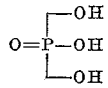

is reacted with propylene oxide, represented by the formula

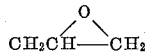

under a 1:1 mole ratio, a beta hydroxy phosphate ester is formed which may be represented by the following formula:

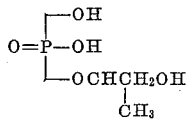

If the mole ratio of propylene oxide to orthophosphoric acid is increased, the remaining hydroxyl groups attached to the phosphorus atom will be esterfied forming a tris-beta hydroxy phosphate ester. The secondary alcohol hydroxyl groups of the ester contain an active hydrogen and, accordingly, may likewise be reacted with additional alkylene oxide compounds to produce a chain type ester at each of the hydroxyl positions of phosphoric acid. Compounds of this type are disclosed in the aforementioned Adams et al. patent, together with a generic formula representing the variety of compounds obtainable. Example I of the Adams et al. patent discloses a process for making a dipropylene glycol tri-substituted ester of phosphoric acid.

An anomaly has been found with respect to styrene oxide in that when styrene oxide is reacted with a phosphoric acid, such as orthophosphoric or pyrophosphoric acid, an adduct is formed, which is somewhat similar to that obtainable with an alkylene oxide, but differs in that a secondary hydroxyl group does not result. Rather, the reaction of styrene oxide with phosphoric acid results in the formation of an ester having an unsaturated position. The presence of the unsaturation permits copolymerization of the phosphoric acid-styrene oxide ester with other unsaturated compounds and thereby enables the introduction of phosphorus-containing constituents into a variety of compounds. Phosphorus compounds, particularly of the type contemplated herein, offer unique flame retardant properties. Hence, the adducts obtainable may be copolymerized with other unsaturated compounds to form a resinous or polymeric composition having, for example, integral flame retardant characteristics.

The present invention, in one aspect, contemplates esters of acids of phosphorus from the group consisting of

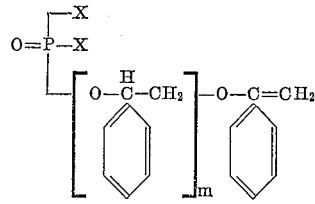

and

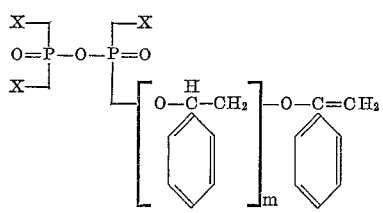

wherein X represents a member of the class consisting of —OH and

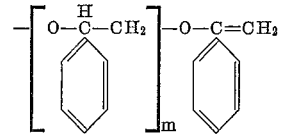

and wherein $m$ is an integer from the group consisting of zero and a whole number, but preferably not more than 3.

The extent of the chain length derived from each of the phosphoric acid hydroxyl groups will, of course, depend upon the amount of styrene oxide employed. In general, each of the hydroxyl groups will be adducted by the styrene oxide prior to developing additional groups within a particular chain. As it can be seen in the case of orthophosphoric acid, to obtain at least two styrene oxide units per hydroxyl position would require a theoretical mole ratio of styrene oxide to orthophosphoric acid of at least 6:1. Correspondingly, to obtain two styrene oxide units per chain for pyrophosphoric acid would require a mole ratio of styrene oxide to phosphoric acid of at least 8:1.

The theory of the reaction, whereby an unsaturation is obtained with styrene oxide as distinguished from a secondary alcohol hydroxyl group with alkylene oxides, is not clearly understood at the present time. However, a tentative explanation has been developed. Thus, styrene oxide may be represented by the formula

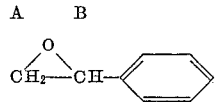

The bond between the terminal methylene and the epoxy oxygen is indicated by the letter "A." This A bond is broken in the normal addition reaction with an alkylene oxide and a phosphoric acid ester is formed containing a secondary alcohol. In connection with the reaction of styrene oxide and phosphoric acid, it appears that the B rather than the A bond is broken yielding a primary alcohol which, in turn, is dehydated, thus producing a double bond or an unsaturation. This theory is based upon the fact that in a reaction of styrene oxide with phosphoric acid, water is produced. Styrene oxide-phosphoric acid ester compounds which have been subjected to infra-red analyses reveal a noticeable absence of hydroxyl groups and a definite indication of a double bond.

In the broader aspects of the invention, the anomaly of the styrene oxide reaction can be applied to modify the basic type of phosphoric acid alkylene oxide reaction product disclosed in the Adams et al. patent. For example, a phosphoric acid may be initially reacted with ethylene or propylene oxide to form esters having a secondary alcohol hydroxyl group, followed by reacting styrene oxide with the secondary alcohol hydroxyl group to produce the desired unsaturation. Thus, in its broadest aspect, the invention contemplates an ester of a phosphoric acid from the group consisting of

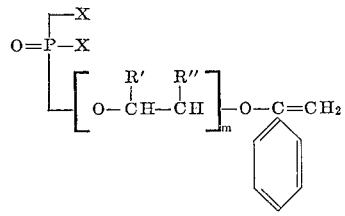

and

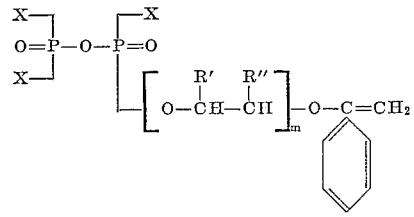

wherein X represents a member of the class consisting of —OH and

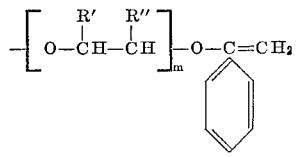

and wherein R′ and R″ are selected from the group consisting of hydrogen, alkyl, aryl, alkaryl, aralkyl and cyclic alkyl radicals and their halogen substituted derivatives, and $m$ is a number from the group consisting of zero and a whole number, but preferably not more than 3. Incorporation of intermediate units, as contemplated by the above formula, other than the styrene oxide derivative, permits properties of the composition to be varied to meet specific conditions, such as viscosity, solubility in solvents and the like, which are of importance if the esters are to be made compatible with other components of a given system. Additionally, by use of an intermediate unit derived from epichlorohydrin, for example, further flame retardant properties can be incorporated in the final composition of which the ester becomes a part.

As further illustrating the invention without intending to limit the same, the following examples are presented of processes for preparing an adduct of pyrophosphoric acid with styrene oxide.

*Example I*

178 grams of pyrophosphoric acid, comprising one mole, were introduced into a two-liter, four-neck flask provided with a stirrer, reflux condenser, thermometer and closed dropping funnel. The contents were cooled in an ice bath. 1052 grams of styrene oxide, representing 8.8 moles, were then introduced into the flask at a rate to hold the reaction temperature below 100° C. After all of the styrene oxide had been added, the temperature was raised to 160° C. over a period of two hours. Evolution of water commenced when the temperature had reached 105° C. When the temperature had reached 160° C., heat was removed and 17 grams of water plus 3 grams of styrene oxide were recovered from the condenser trap. The resulting adduct was then stripped under 72 cm. of Hg vacuum, while the temperature slowly increased to 150° C. over a period of three hours. During this period, 40 grams of water were recovered for a total of 57 grams or 3.2 moles of water per mole of acid. After the water was removed, 100 cc. of toluene were then added to the adduct and the mixture refluxed for two hours under stirring. The mixture was vacuum stripped to a final temperature of 130° C. resulting in a reddish brown compound. Yield of the product was 89.5%. The infra-red spectrograph shows the absence of any peak at 2.8 to 3.0 micron wave length, indicating the lack of hydroxyl groups. Peaks noted between 6.6 and 6.9 micron wave length indicate double bond unsaturation and a strong peak at 9.7 micron wave length confirms the presence of a phosphate ester.

*Example II*

490 grams of orthophosphoric acid, comprising five moles, were introduced into a four-liter, four-neck flask provided with a stirrer, reflux condenser, thermometer and closed dropping funnel. The contents were cooled in an ice bath. 957 grams of propylene oxide, representing 16.5 moles, were then introduced into the flask at a rate to hold the reaction temperature below 50° C. When all of the propylene oxide had been added, the acid number was 240. 1980 grams of styrene oxide, representing 16.5 moles, were then introduced into the flask at a rate to hold the reaction temperature below 90° C. After all of the styrene oxide had been introduced, 200 grams of xylene were then added and a water trap was installed. The temperature was raised to 180° C. over a period of five hours. Evolution of water started when the temperature reached 130° C. During dehydration, the acid number rose from 55 to 83 and the product became darker in color. After the evolution of water ceased, the solvent was stripped off under 29 inches of mercury vacuum to a final temperature of 180° C. Yield of product was 81% and upon analysis was found to contain 4.5% phosphorus.

*Example III*

490 grams of orthophosphoric acid, comprising five moles, were introduced into a four-liter, four-neck flask provided with a stirrer, reflux condenser, thermometer and closed dropping funnel. The contents were cooled in an ice bath. 1527.5 grams of epichlorohydrin, representing 16.5 moles, were then introduced into the flask at a rate to hold the reaction temperature below 100° C. When all of the epichlorohydrin had been added, the acid number was found to be 88. 1980 grams of styrene oxide, representing 16.5 moles, and 200 grams of xylene were then introduced into the flask at a rate to hold the reaction temperature below 80° C. After all of the styrene oxide had been added, the temperature was raised to 190° C. over a period of two hours. During dehydration, the acid number rose from 35 to 62 and the product become darker in color. When water was no longer evolved, the solvent was stripped off under 29 inches of mercury vacuum to a final temperature of 155° C. Yield of the product was 78%. The product contained 3.9% phosphorus and 14.6% chlorine.

Reaction of styrene oxide with phosphoric acid of the class indicated above may be carried out at various temperatures within the range of about −10° C. to 110° C. and at various pressures, ranging from atmospheric to sufficient pressure to maintain the reactants in the liquid phase.

Having described the invention and certain exemplary embodiments thereof, the same is only intended to be limited by the scope of the following claims.

We claim:

1. An ester of acids of phosphorus from the group consisting of

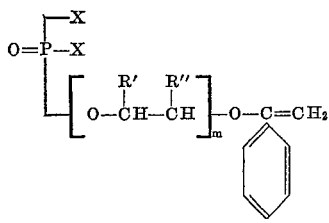

and

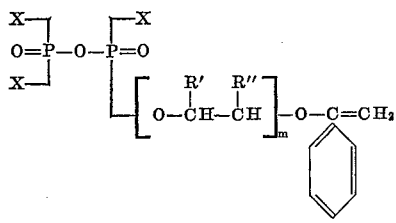

wherein X represents a member of the class consisting of —OH and

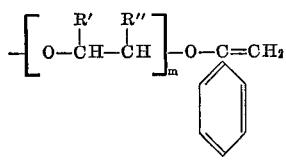

and wherein R' and R'' are selected from the group consisting of hydrogen, lower alkyls and phenyl and their halogen substituted derivatives, and m is a number from the group consisting of zero and a whole number.

2. A process of preparing an ester of a phosphoric acid from the group consisting of orthophosphoric acid and pyrophosphoric acid which comprises initially reacting said phosphoric acid with an alkylene oxide and subsequently reacting the resulting ester with styrene oxide.

3. A process of preparing an ester of a phosphoric acid from the group consisting of orthophosphoric acid and pyrophosphoric acid which comprises initially reacting said phosphoric acid with epichlorohydrin and subsequently reacting the resulting ester with styrene oxide.

4. A process of preparing an ester of pyrophosphoric acid which comprises reacting said phosphoric acid with styrene oxide in a mole ratio of at least 1 to 8.

5. An ester of orthophosphoric acid having the following formula:

wherein X is the group:

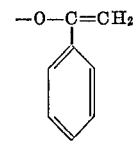

6. An ester of orthophosphoric acid having the following formula:

wherein X is the group:

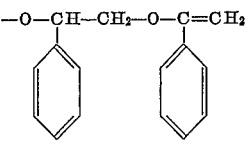

7. An ester of pyrophosphoric acid having the following formula:

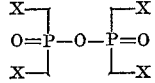

wherein X is the group:

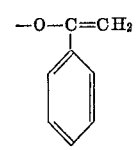

8. An ester of pyrophosphoric acid having the following formula:

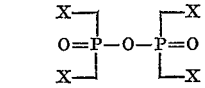

wherein X is the group:

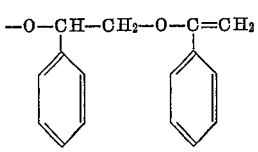

References Cited in the file of this patent
UNITED STATES PATENTS
2,372,244    Adams et al. _____ May 27, 1945